(12) United States Patent
Frankeny

(10) Patent No.: US 6,419,082 B1
(45) Date of Patent: Jul. 16, 2002

(54) MEDIA STORAGE UNIT WITH EXPANDABLE AND SEPARABLE POCKETS

(76) Inventor: Richard Francis Frankeny, 2716 Barton Creek Blvd. #414, Austin, TX (US) 78735

( * ) Notice: Subject to any disclaimer, the term of this patent is extended or adjusted under 35 U.S.C. 154(b) by 0 days.

(21) Appl. No.: 09/597,319

(22) Filed: Jun. 19, 2000

(51) Int. Cl.$^7$ .............................................. B65D 85/57
(52) U.S. Cl. .................... 206/308.1; 206/311; 206/312; 206/313; 206/309
(58) Field of Search .............................. 206/308.1, 311, 206/312, 313, 309

(56) References Cited

U.S. PATENT DOCUMENTS

| 4,762,225 A | * | 8/1988 | Henkel ..................... 206/308.1 |
| 5,246,107 A | * | 9/1993 | Long et al. .............. 206/308.1 |
| 5,291,990 A | * | 3/1994 | Sejzer ......................... 206/748 |
| 5,682,992 A | * | 11/1997 | Hunt et al. ................. 206/309 |

FOREIGN PATENT DOCUMENTS

WO    WO 94/01866    *    1/1994

* cited by examiner

Primary Examiner—Mickey Yu
Assistant Examiner—Troy Arnold
(74) Attorney, Agent, or Firm—Richard F. Frankeny; Winstead Sechrest & Minick P.C.

(57) ABSTRACT

A media storage unit is made by z-folding either a joined or a continuous web of material planes forming a plurality of N overlaid material planes. The material planes have tabs extending from both non-folded sides symmetrical about a center line of each material plane. Slits are made starting on each non folded side and extending a length towards the center of each material plane. The two slits on each material plane are made at the mid-point of the material planes between the tabs allowing the tabs be separated. Opposing tabs on each side of the overlaid material planes and closest to a folded side are joined with a corresponding tab on a adjacent overlaid plane, the opposing tabs are deflected and joined in opposite directions. The joined tabs become the retaining side members of a plurality of pockets formed by the overlaid material planes. The folded sides become the bottoms of sequential pockets with openings in opposite directions. When the N overlaid material planes are folded and the tabs joined they form N−1 separable and expandable pockets with opposing openings. Tabs are positioned adjacent to a slit and have a width extending out from the material planes and a length extending towards folded sides. The tabs may have a variety edge of geometries each of which, when joined, affects the nature of a pocket opening when the pocket is expanded. In general the tabs have a type of tapered width extending from the material planes with the widest edge at the slit and tapering to a narrower width towards a folded side of the material planes. Joined tapered tabs, create a pocket that opens a variable amount when expanded, the opening the widest at a slit. The length of the slits affect how much a pocket will separate from another adjacent pocket as the media storage unit is expanded to access a particular stored media.

31 Claims, 9 Drawing Sheets

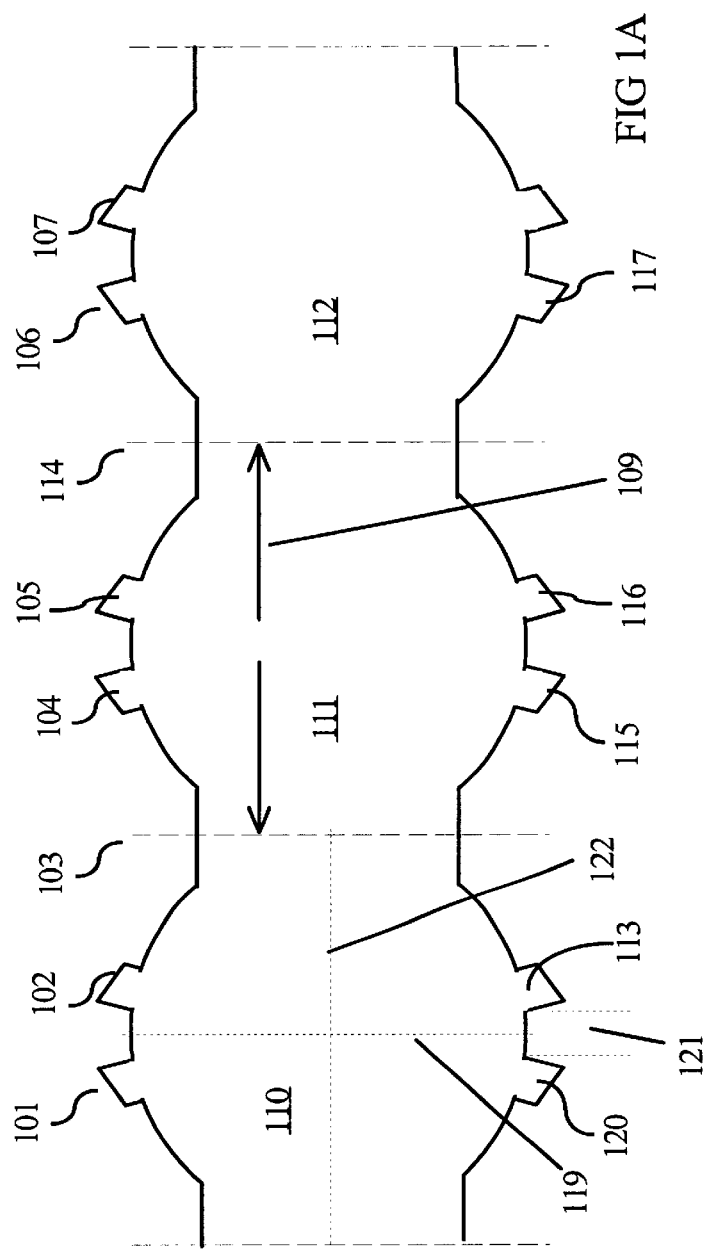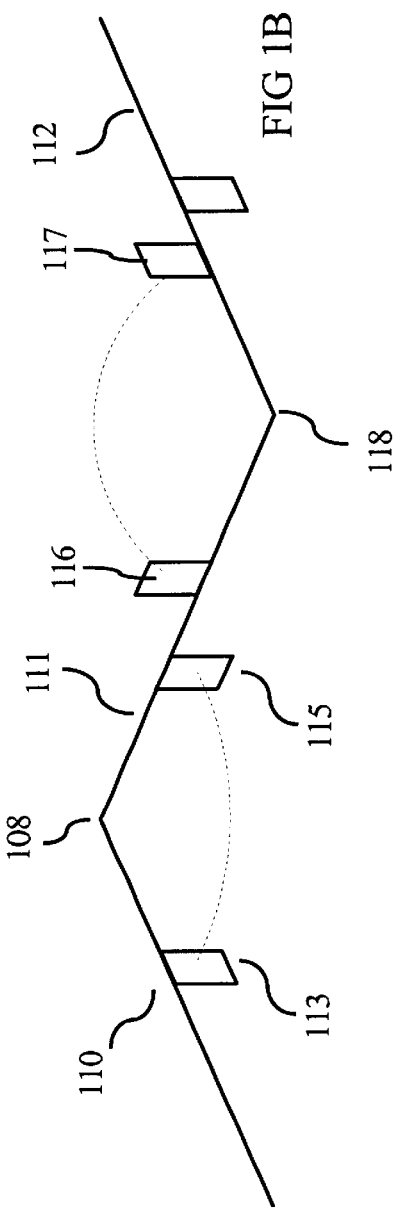

MEDIA STORAGE UNIT WITH EXPANDABLE AND SEPARABLE POCKETS

TECHNICAL FIELD

The present invention relates in general to media storage units, and in particular, to fabric pocket structures used to store media.

BACKGROUND INFORMATION

Media and especially media for recording music has changed significantly over the years. Early media included records, eight track magnetic tape, and cassettes. With the advent of compact discs (CDs), small media storage units can now store a considerable number of media elements. The small physical size of media for recoding information, for example the CD, has led to the standardization of media for music, instructional, software and other data content. The CD format has been extended to both read only and read/write, further increasing the use of this media. Disc media other than CDs (e.g., mini Disc by Sony) which have the high density storage and small size have also been applied to music. Recently the introduction of the digital versatile disc (DVD), in the same physical size as the CD, has enabled video as content that can be played on small portable playstations. The fact that a standard, compact media size (DVD and CD) has emerged and the fact that all types of content including music, pictures, movies, databases, software, games, etc., have become available on these media, has created a new paradigm in portability of players and storage devices.

Since many people are acquiring large collections of CDs and now the new DVD media, there is a growing need for storage devices for the media. A pocket or a sleeve is one of the popular storage structures for media that is simple, compact and provides protection for CDs, DVDs and other media. There are many styles of pockets or sleeves on the market; many are made out of material such as plastic or cloth. When pockets are used in conjunction with a housing or container for the pockets, there is a need for the pockets to be separated so the information on the media stored in the pocket may be observed for identification. Since it is desirable to have the pockets in a storage unit coupled together so they operate as a unit, a method of separating individual pockets while maintaining the integrity of the group of pockets is needed. The U.S. Pat. No. 5,682,992 issued to Hunt et al. teaches one such method of grouping pockets. In this reference, a z-fold (referred to as zigzag) cloth structure is disclosed which creates overlaid planes that are joined to make pockets. In Hunt et al., pockets are made by seaming the overlaid planes starting at a bottom up to a point a distance "x" from the midpoint of the planes. The seam is interrupted for another distance "x" and then commenced with a next overlaying plane. This method creates opposing pockets sharing a common plan and separable (one pocket away from the next by a distance "x" in either direction). Hunt et al., also creates a pocket structure that remains fixed in a pocket width (opening or expansion) as the pockets are separated to allow media to be accessed for retrieval. Seaming each pocket starting at the bottom makes an enclosed half pocket where the edge of the media is protected for half its diameter or width minus the distance "2x" at which seaming stops. To make a pocket by this method and separable by larger amounts requires more and more of the pocket seam to be truncated creating a smaller and smaller enclosed pocket. The pocket taught in Hunt et al, remains constant in width (expansion) when the pockets are separated keeping media in the center of the pocket. Making a media pocket with this feature adds considerable labor and cost. Likewise, when the pockets with this feature are separated, fixing a media within the center of the pocket may restrict the media from moving further, exposing its surface for viewing. While the pocket features disclosed and claimed in Hunt et al. may differentiate it from existing art, they add cost and do not appreciably improve the functional design of the pocket itself. The seaming method used in Hunt et al., where the seam extends outside and along almost one half the media (one-half minus "2x") causes the pocket to be larger than is necessary requiring a large housing when the separable pockets are incorporated into a complete storage unit. Seaming a pocket over a large curved area also makes placing an adhesive, sewing or otherwise bonding this curved area difficult.

A z-fold pocket structure with its common or shared plane creates pockets having openings that face in opposite directions. While this may be viewed as a limitation, the common plane shared by two pockets may require less material than some other designs. A housing that makes use of the z-fold pocket for storing media is disclosed in U.S. Pat. No. 5,785,399 issued to Frankeny, et al. The storage unit has a design that allows selectively exposing the openings of a z-fold separable pocket structure like the one in Hunt et al. While the z-fold pocket structure has advantages, the structure disclosed in Hunt et al. with its claimed limitations is difficult to manufacture and requires considerable manual labor and a manufacturing location where labor costs are very low.

Therefore there is a need for a z-fold expandable and separable pocket structure which is simpler to make, smaller, lower in cost, and maintains the functionality and utility of a pocket structure with opposing pocket openings.

SUMMARY OF THE INVENTION

Expandable and separable z-fold pockets are made by starting with a z-folded web of material with novel outline design features. The material, cut into repetitive patterns, is z-folded, overlaid and joined to make an expandable and separable pocket structure that is simple to manufacture yet retains all the necessary features for storing and protecting a media. Necessary features for storing a media in a pocket require the pocket to cover the media element surfaces where information is stored when the pocket is not expanded and to provide bottom and side retention for the stored media at all times.

The material pattern has the general shape of the media to be stored (e.g., round for a CD). At the centerline of the material pattern opposing and symmetrical tabs project out from both unfolded sides of the material planes. These tabs, in general, may be cut on an angle and extended back toward the folded sides of the material plane. The distance between folded sides defines a closed dimension of a finished pocket. Additionally, in embodiments of the present invention, a slit is made at the center of each unfolded side starting at the midpoint of the material planes and extending a distance toward the center of the material plane. The slit is used with one or two tabs on each unfolded side. Using two tabs, the tabs are free to be independently joined with other corresponding but opposing tabs on overlaid adjacent material planes. By alternately joining tabs, the sides of the opposing pockets are formed. These joined tabs create the retaining side members of the pockets while remaining outside the pocket itself. This makes joining the material planes, to form the retaining sides of the pockets, simpler requiring less labor to make, requiring less joining material, and reducing the outside dimension of finished pockets for a particular sized media element.

In one embodiment of the present invention two single tabs, when folded and joined, create a retaining sides similar to the retaining sides formed by joining two double tabs. Two tabs, one on each unfolded side of a material plane, are folded along a fold line and joined to an adjacent overlaid material not integral with the two single tabs. Joining tabs on N overlaid material planes creates N−1 expandable and separable pockets of the expandable media storage unit.

The shape of the tabs allow the pocket opening to expand an amount as the pockets are separated to access stored media. The slits function to allow the pockets to translate and separate during pocket expansion. The separation function provided for by the slits allows the expanded pocket to have a full retention depth of one half an un-expanded pocket. As pockets are being separated, one material plane in the first pocket is separated from the corresponding opposing material plane. This causes the first pocket to expand until the joined tabs commence to pull the opposing plane. The slit then allows the half of the pocket (e.g., containing a stored media element) to translate until the portion of the material plane that is not slit begins to pull on the material plane of the next succeeding pocket. In this manner the pockets may be fully separated, each pocket separating by an amount determined by the slit length. The pockets will simultaneously be expanded or opened by an amount determined by the shape and the width of the joined tabs.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A is an embodiment of the present invention with a web of material designed to form expandable and separable pockets without using a slit in the material planes.

FIG. 1B illustrates the edge view of the material planes in FIG. 1A partially z-folded indicating which tabs are joined.

DETAILED DESCRIPTION

Figures 2A, 2B:
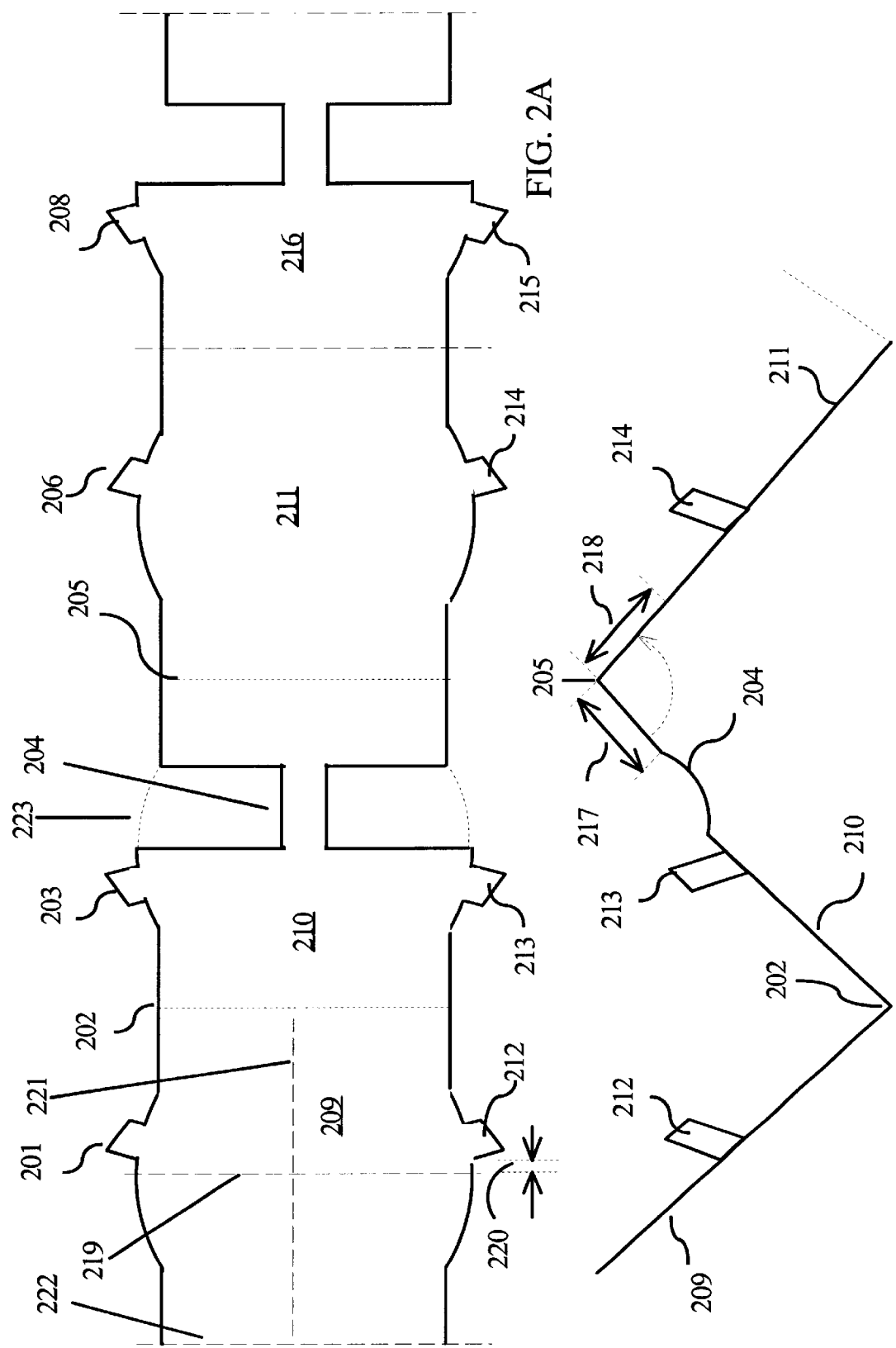
FIG. 2A is another embodiment of the present invention with a web of material designed to form expandable and separable pockets with non opposing openings.
FIG. 2B illustrates the edge view of the material planes in FIG. 2A partially z-folded indicating which tabs are joined.

In the following description, numerous specific details are set forth to provide a thorough understanding of the present invention. However, it will be obvious to those skilled in the art that the present invention may be practiced without such specific details. For the most part, details concerning specific lengths or widths of material and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1A and FIG. 1B illustrate a section of a web of continuous material planes 110, 111 and 112. Dashed lines 103 and 114 indicate z-fold lines which will become folded sides of finished expandable and separable pockets. In this embodiment of the present invention each material plane has four tabs, for example material plane 111 has tabs 104, 105, 115 and 116. FIG. 1B illustrates the material planes 110, 111, and 112 partially z-folded. Tabs 113 and 115 are positioned closest to folded side 108 and are joined to form one retaining side of a pocket formed by the overlaying of material planes 110 and 111. The other retaining side of the pocket formed by overlaying material planes 110 and 111 is made when corresponding tabs 102 and 104 (also positioned closest to folded side 108) are joined. Correspondingly tabs 116 and 117 are closest to folded side 118 and will form a retaining side of the opposing pocket formed by overlaying material plane 112 and 111. Tabs 105 and 106, also closest to folded side 118, are joined to form the other retaining side of the pocket formed by overlaying material planes 111 and 112. Tab 101 would be joined to a material plane (not shown) adjacent and to the left of material plane 110. Arrows 109 indicate the pocket dimension between fold lines 103 and 114 (become folded sides 108 and 118 when planes z-folded). Line 119 is a line through the center of material plane 110 wherein tabs 113 and 120 are positioned symmetrically a tab space 121 about line 119. Line 122 is a line also through the center of exemplary material plane 110 and perpendicular to fold lines (e.g. fold line 103). The two unfolded sides of material plane 110 are the two material edges of material plane 110 positioned symmetrically about line 122.

As the z-folding and tab joining proceed a plurality of expandable and separable pockets are formed (two or more required to have pockets that separate). N joined layers will form N−1 expandable and separable pockets. In the illustrations of FIG. 1A and FIG 1B, the tabs are shown cut on a taper which, when joined, results in a pocket with a variable opening (opening varies in width from center of a material plane toward a folded side) when expanded and during pocket separation. With joined tapered tabs the pocket opening will have a tapered opening over the width of the joined tapered tabs. Other embodiments of the present invention may use non tapered tabs.

FIG. 2A illustrates another embodiment of the present invention where material planes 209, 210, 211 and 216 are used to make expandable and separable pockets where all the pockets have openings in the same direction. The material planes are two types, for example type one is between line 222 and folded edge 202 and the type two is between folded edge 202 and folded edge 205. FIG. 2B illustrates the planes 209, 210 and 211 partially z-folded. Material plane 209 will overlay material plane 210, when z-folded, creating folded side 202. Material plane 210 (type two) has features different from material plane 209 and 211 (type one). When the material planes 209 and 210 are overlaid, tab 201 is joined to tab 203 and tab 212 is joined to tab 213. The portion of material plane 210, coupled to(by joining tabs) folded side 202, forms a portion of an expandable and separable pocket. Material strip 204 remains free and the remainder of material plane 210, from the end of material strip 204 to folded side 205 (material 217), is bonded to a corresponding portion (material section 218) of material plane 211. Succeeding pockets are formed by z-folding and tab material joining, for example an adjacent pocket to the pocket with folded side 202 is formed by joining tab 206 to tab 208 and joining tab 214 to tab 215 when material plane 216 is overlaid on material plane 211.

Dimension 220 illustrates that tabs may be positioned an amount from an exemplary material plane center line 219. Center line 219 is parallel with unfolded sides of the material planes (209, 210, 211 and 216). Center line 221 is perpendicular to exemplary folded sides 202 and 205. Folded side 205 is in common with material planes 210 and 211. Folded sides 202 and 205 can be thought of as being folded side so material plane 210 (type two material plane) that are in common with a preceding type one material plane 209 and a succeeding type one material plane 211. This symmetry would exist thought a web of alternating type one an type two material planes according to embodiments of the present invention. Material strip 204 may extend to an exemplary dotted line 223 is shown to illustrate that it may be variable in shape and size and still be within the scope of the present invention.

When one pocket (e.g., the one formed by material planes 209 and 210) is separated from the adjacent pocket (e.g., the one formed by material planes 211 and 216) the material strip 204 acts to pull the pocket like a chain link. In this manner, a plurality of pockets formed using embodiments illustrated in FIG. 2A and FIG. 2B may be continuously separated and expanded to access stored media.

Figure 6A:
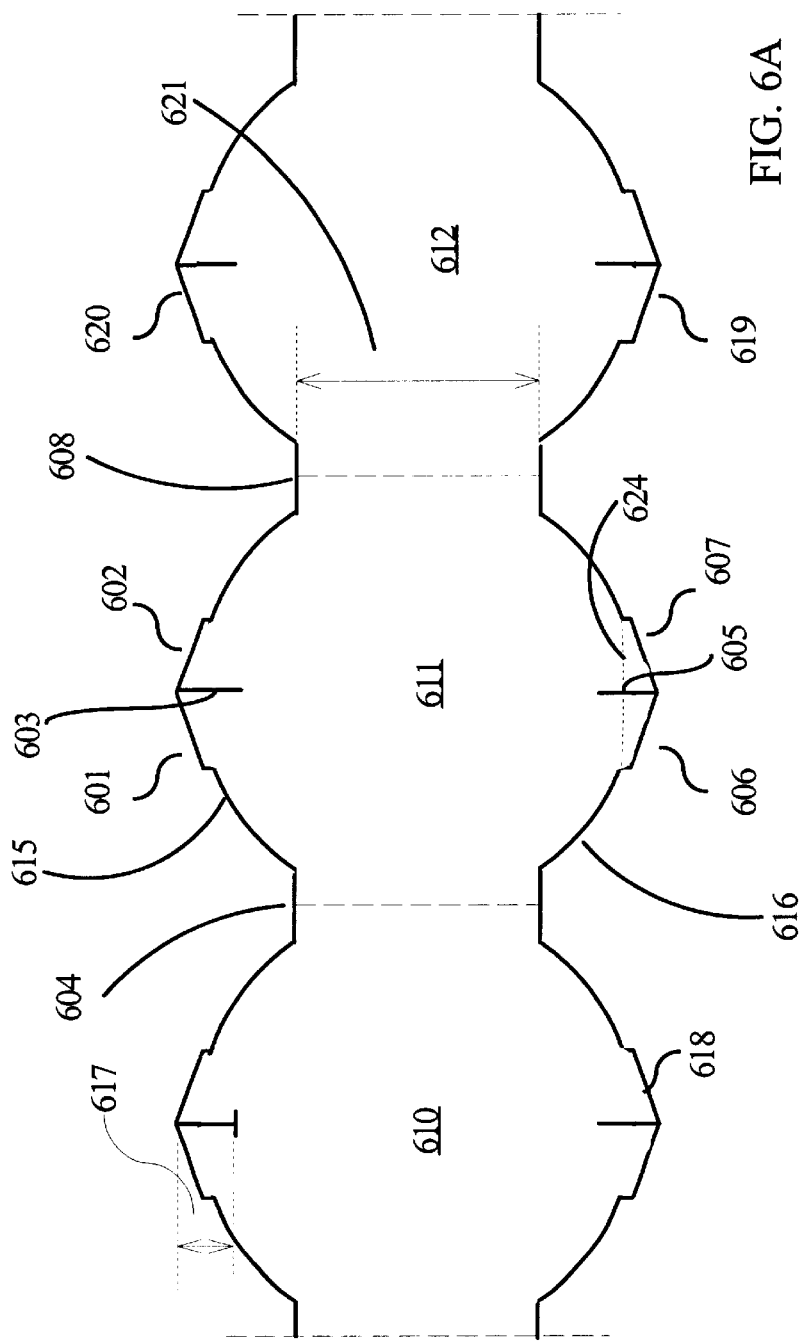
FIG. 6 is an illustration of an un-joined web of material used in embodiments of the present invention with four tabs and a slit in each material plane.
Figure 6B:
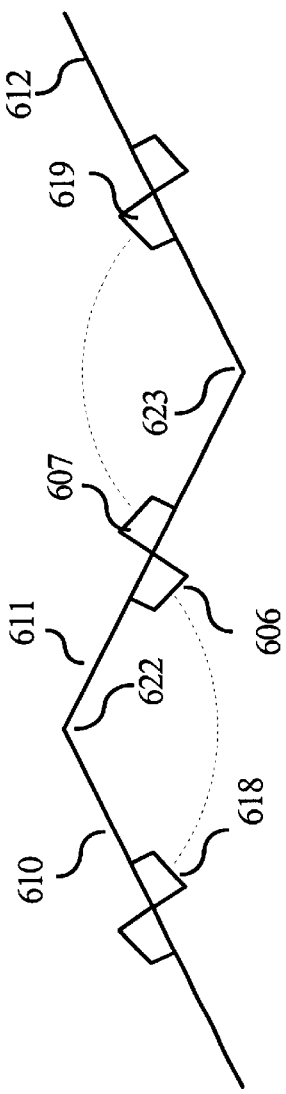

FIG. 6A and 6B illustrates a section of a web of material planes with features used in another embodiment of the present invention. FIG. 6A shows the material planes unfolded and FIG. 6B shows the material planes partially z-folded The material planes 610, 611, 612 are z-folded at folded lines (e.g., 604 and 608) creating three overlaid material planes with folded sides 622 and 623. Each material plane (e.g., 610, 611, and 612) has features used in embodiments of the present invention. Each material plane (e.g., material plane 611) also has exemplary slits 603 and 605 at the midpoint between folded lines (e.g., 604 and 608). Exemplary slits 603 and 605 extend from unfolded sides 615 and 616 (material edges from fold line 604 to fold line 608) respectively toward the center of material plane 611. Two opposing tabs 601 and 602 are positioned on each side of slit 603 and extend from slit 603 in opposing directions toward folded sides 604 and 608 respectively. Since the tabs (e.g., 601 and 602) are an integral part of the material plane, dotted line 624 is used to further illustrate what portion of the material plane (e.g., 611) in this embodiment may be thought of as defining tabs 601 and 602. Likewise slit 605 extends from unfolded side 616 toward the center of material plane 611 a slit length (e.g., 617). Tabs 606 and 607 are positioned on each side of slit 605 and extend from the slit 605 in opposing directions toward folded sides 604 and 608 respectively. In the illustration in FIG. 6A, the tabs on each material plane (e.g., 610, 611 and 612) are tapered, being wider (referenced to line 624) at a slit (e.g., 603 and 605) and getting narrower as they extend toward a folded side (e.g., 604 and 608). Taped tabs (e.g., 601, 602, 606, and 607), which are joined along their tapered edges, create pocket openings that vary when the pocket is expanded. The opening is wider at the slit and narrows toward a folded side (e.g., 604 and 608). When tabs (e.g., 606 to 618) are joined they form the retaining sides of an opposing pocket to the pocket formed by material planes 611 and 612. When a pocket is not expanded, the distance (not shown) from a point on a joined edge of a tab to a corresponding point on a joined edge of an opposing tab is longer than the same distance when the pocket is expanded. As a pocket is expanded, the joined edges on the tabs move toward a stored media and may be made to contact the media thereby limiting how much a pocket may be expanded.

Embodiments of the present invention place an adhesive (not shown) on opposing sides of tabs on opposite sides of a given slit, for example tabs 602 and 603 are on opposite sides of slit 605. When exemplary material planes 610, 611, and 612 are z-folded, exemplary tabs 607 and 619 (which are positioned closest to folded side 608), will overlay and they are joined to form one retaining side element of a pocket formed by overlaying material planes 611 and 612. Corresponding opposing tabs 602 and 620 are also joined to form the other retaining side element for the pocket formed by overlaying planes 611 and 612. Alternately tabs 606 and 618 are closest to folded side 604 and are joined to form a retaining side element to the pocked formed by overlaying planes 610 and 611. When the material planes are z-folded, alternate pockets have a common material plane with the opposing surfaces of the common material plane forming the inside of opposing pockets. The folded sides have a fold width indicated by 621. The folded sides (e.g., 622 and 623) of the material planes form the bottom of an expandable and separable pockets. The width (e.g., 621) of exemplary folded side 623 may be varied, by design, up to the maximum width used for the material planes.

Figure 7:
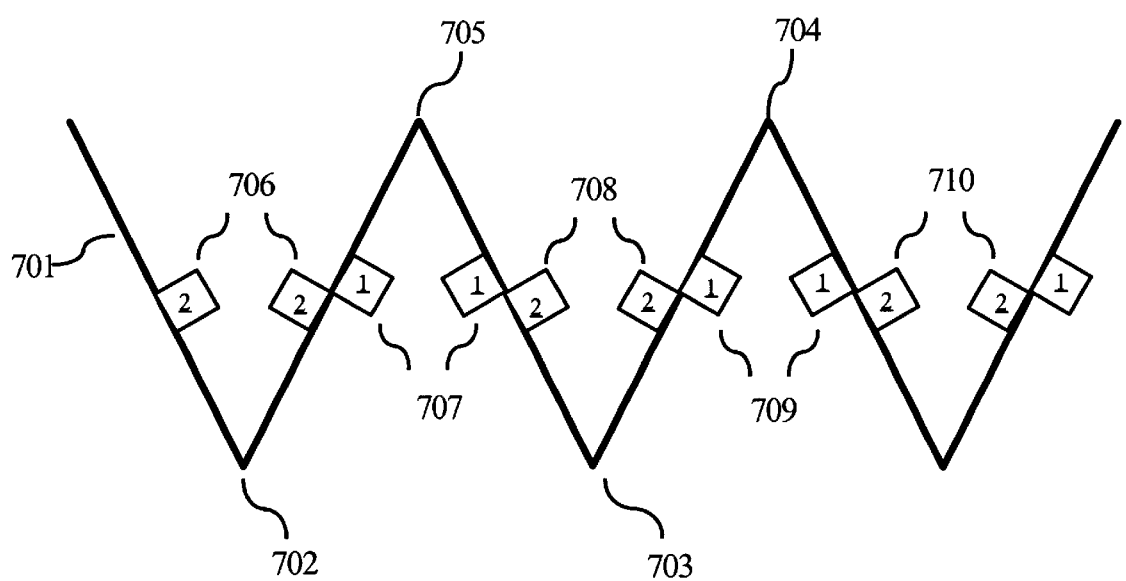
FIG. 7 is an illustration of one embodiment of the present invention with z-folded material planes showing tabs that are to be joined to form retaining sides of the expandable and separable pockets.

FIG. 7 illustrates another view of material planes partially z-folded. Exemplary folded sides 702, 703, 704, and 705 are some of the folded sides that are formed when a web of continuous material planes is z-folded. Tabs pairs 706, 707, 708, 709, and 710 illustrate which tabs are joined to make retaining sides of the expandable and separable pockets. Material plane 701 is an example of one of the material planes that form retaining sides of the expandable and separable pockets. The shape of the tabs 706, 707, 708, 709, and 710 are not tapered and do not have a particular shape according to embodiments of the present invention but are used to illustrate which of the plurality of tabs are joined together (corresponding tabs have underlined numbers 1 or 2) to form retaining sides.

Figure 3:
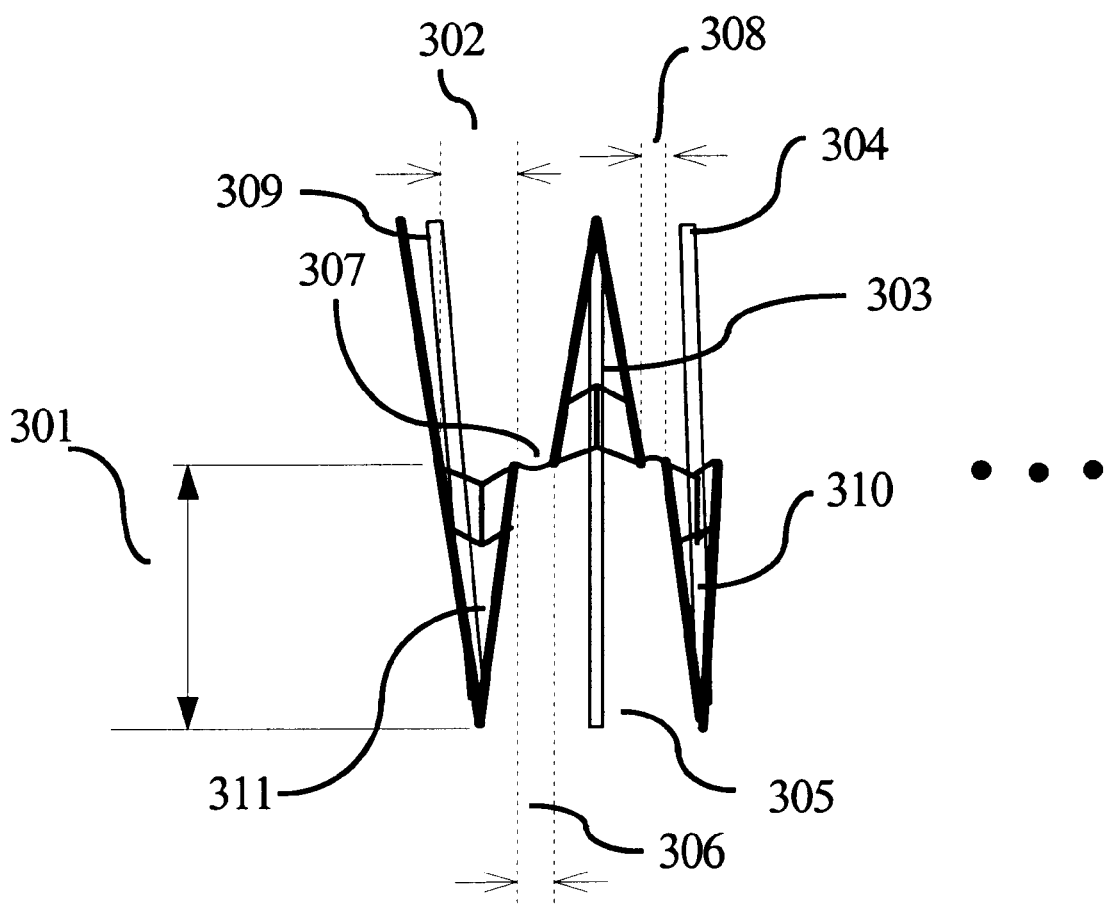
FIG. 3 is an illustration of one embodiment of the present invention showing pockets in various stages of expansion and separation.

FIG. 3 illustrates a side view of material planes (e.g., material planes illustrated in FIG. 5 and FIG. 6) that have been tab joined to form expandable and separable pockets. FIG. 3 illustrates media 304, 305 and 309 stored in opposing pockets 303, 310 and 311. Pocket 311 is expanded an amount 302 and separated by an amount 306. The variable opening width of pocket 311 is visible and media 309 is shown leaning, to the left of center, towards material plane 312 (the pocket width is not fixed when pocket separates). Pocket 310 is shown separated a smaller amount 308 and is less expanded than pocket 303 or 311 in the illustration in FIG. 3. Line 307 illustrates an material edge created by a slit such as the slits 603 and 605 illustrated in FIG. 6. Dimension 301 indicates the depth of the pocket 311 it is expanded.

Figure 4:
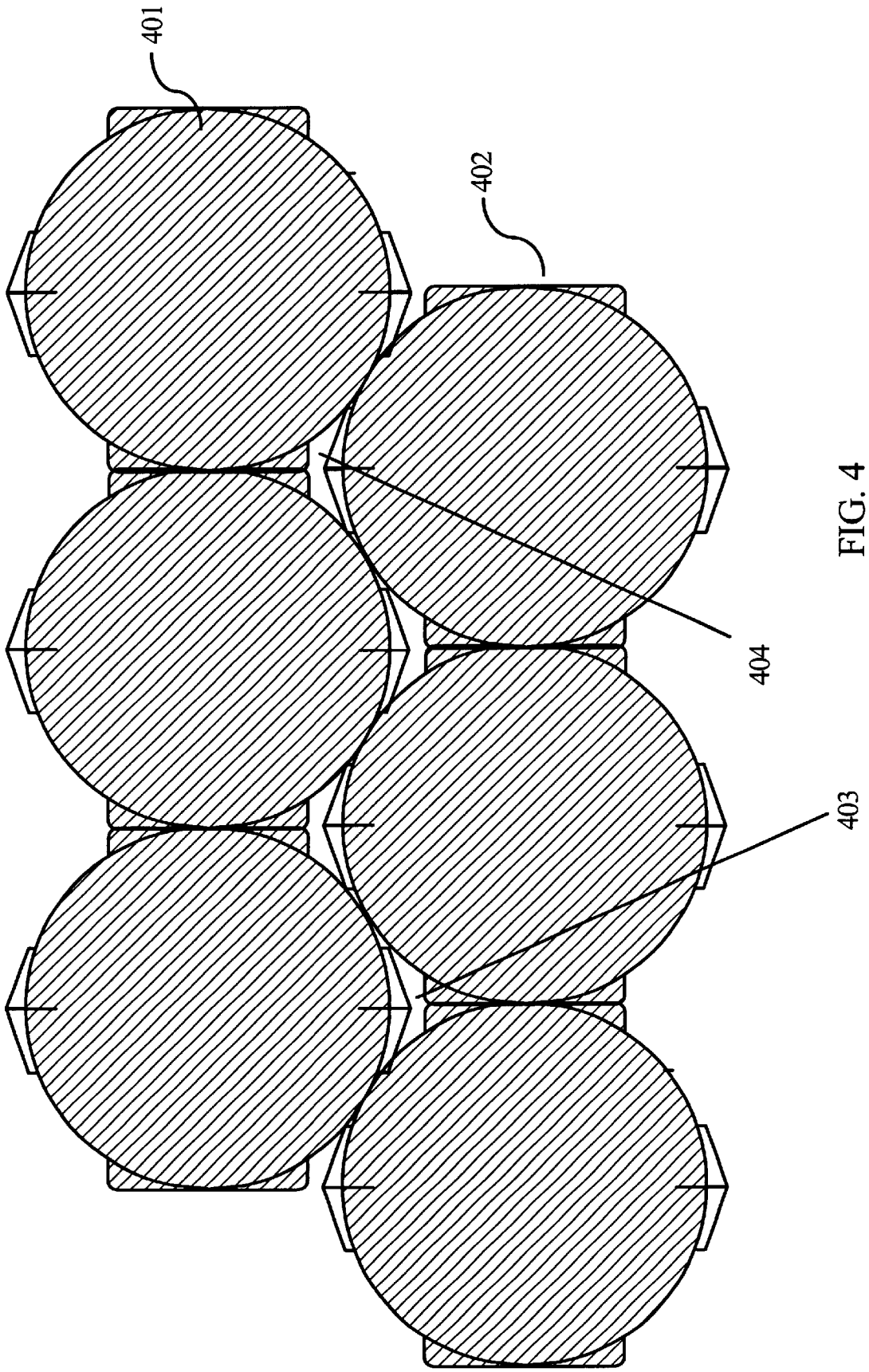
FIG. 4 is an illustration of multiple material planes, in one embodiment of the present invention, showing how a die cut would waste little material when cutting material planes from a wide material web.

FIG. 4 illustrates three material plane patterns 401 and 402 on a wide web of material. A material die cutter (not shown) may be designed to allow a wide web of material to be cut into webs of narrower material planes used to make the expandable and separable pockets in embodiments of the present invention. FIG. 4 illustrates the efficiency of material use of the material pattern design used in one embodiment of the present invention. This results in a lower cost of pockets made according to embodiments of the present invention. The cross hatched material plane patterns 401 and 402 represent material used to make pockets and the exemplary interior non cross hatched areas (e.g., 403 and 404) represents material that would be lost in die cutting.

Figures 5A, 5B:
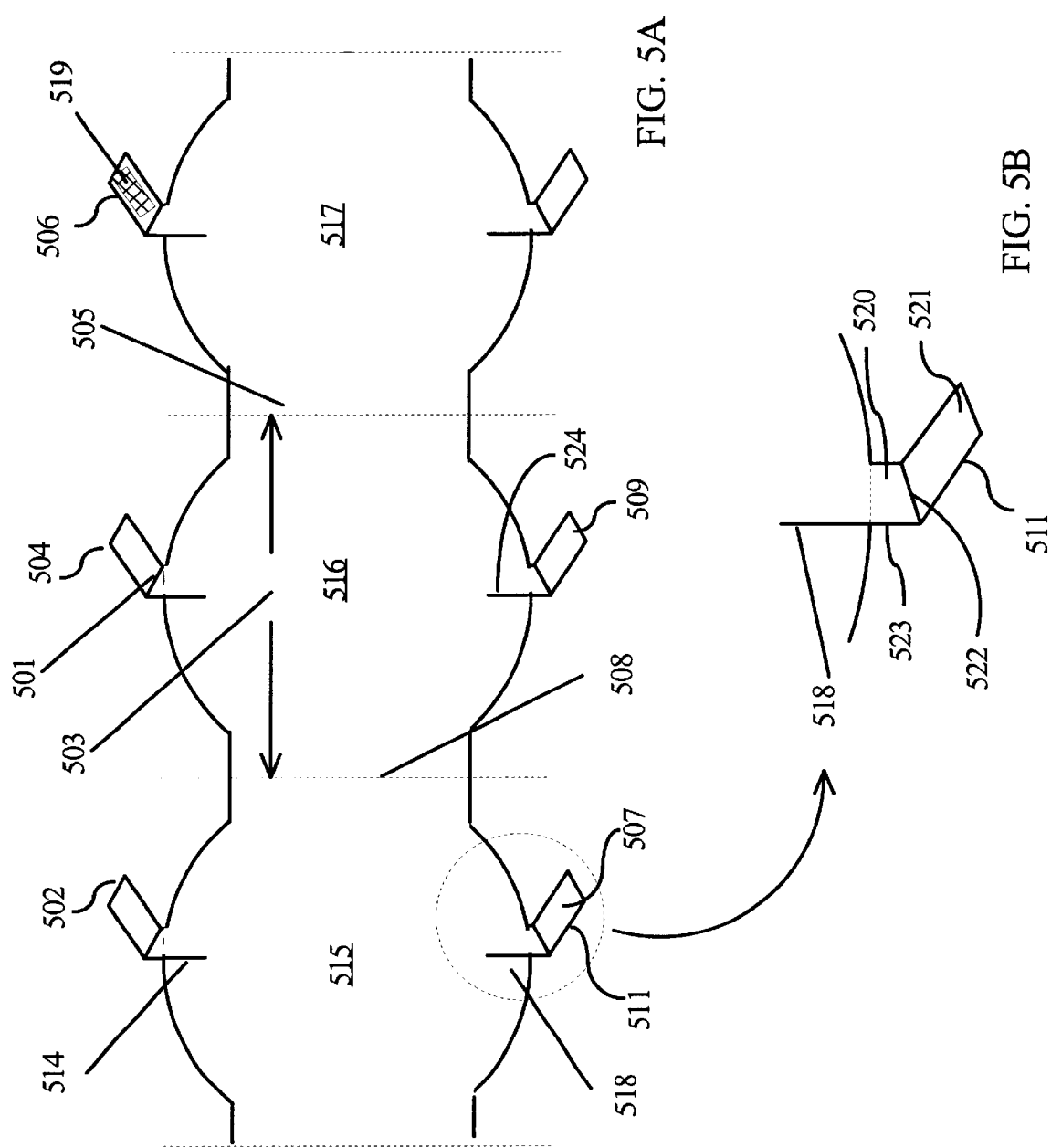
FIG. 5 is an illustration of an un-joined web of material used in embodiments of the present invention with two tabs and a slit in each material plane.

FIG. 5A illustrates another embodiment of the present invention with material planes features including two shaped tabs and two slits in. FIG. 5B is an expanded view of a tab 507 illustrating details of the tab. FIG. 5A illustrates a section of a web of material comprising material planes 515, 516 and 517. Exemplary material plane 515 has shaped tabs 502 and 507 and slits 514 and 518. Like other embodiments, the material planes (e.g., 515, 516 and 517) are z-folded to form exemplary folded sides 508 and 505. When an exemplary material plane 517 is overlaid on material plane 516, tabs 504 and 509 are folded over (e.g., tab 504 is folded along line 501) and joined to the side of material plane 517 not touching material plane 516. The tabs are designed so that when they are folded along their tab fold lines (e.g., 504 is folded along tab fold line 501) the tab will lay with the edge, closest to the slit, parallel to its corresponding slit (e.g., edge 511 for slit 518). The tabs each may have a bonding material or adhesive (e.g., adhesive 519 on tab 506) for joining a folded tab onto a corresponding overlaid material plane. The embodiment in FIG. 5A allows material planes to be z-folded overlaying an adjacent plane one at a time. Corresponding shaped tabs are then folded and bonded to the exposed surface of the overlaid material plane. For example, when z-folding material planes 515, 516 and 517, all the material planes to the right of material plane 515 may be folded to the left (along line 508), with material plane 516 overlaying material plane 515. Tabs 502 and 507 would be positioned below material plane 516. These tabs would then be folded along their corresponding tab fold lines and bonded to the surface of material plane 516 which does not touch material plane 515. Then all the un-joined material planes (joined by joining corresponding tabs) that were to the right of material plane 515 would be to the left of both material plane 515 and 516. The material planes to the left of 516 (e.g., material plane 517) may be folded (along line 505) to the right with material plane 517 overlaying material plane 516. Shaped tabs 504 and 509 on material plane 516 (after folding along 505) are then positioned below material plane 517 and would be folded along their fold line and bonded to the surface of material plane 517 which does not touch material plane 516. This process may proceed until N material planes are so tab bonded forming N−1 expandable and separable pockets. FIG. 5B further illustrates features of a shaped tab 507. Tab 507 has two parts, parallelogram shaped material 520 and 521. Edges of parallelogram shaped material 520 and 521 are mirror images when projected around tab fold line 522. The edge of the material formed by slit 518 is parallel with and contiguous with an edge 523 of parallelogram shaped material 520. Edge 511 of parallelogram shaped material 521 is a mirror image projection of edge 523. When tab 507 is folded on tab fold line 522 towards the material plane 515 edge 511 of parallelogram shaped material 521 will become parallel with the edge of slit 518. When material plane 516 is z-folded over material plane 515 and tab 507 is tab folded along tab line 522 and over material plane 516, the edge 511 of parallelogram shaped material 521 will be parallel to the edge of slit 524. Joining tab 507 to material plane 516 keeping edge 511 parallel to the edge of slit 524 forms one retaining side of an expandable and separable pocket. Opposing tab 502 would be joined to material plane 516 overlaid on material plane 515 to form the other retaining side of the same pocket.

The angle of exemplary tab fold line 501 forms a tapered edge on the tabs illustrated in FIG. 5 like the tapered tabs in FIG. 6 and they function to make an expandable and separable pocket with a variable and tapered opening as described in the embodiment in FIG. 6. Other embodiments of the present invention using two tabs may also have tabs with non-tapered tab edges wherein the expandable and separable pockets have a less uniform variable pocket opening. In this embodiment the tab would have a straight tab fold line perpendicular to edges of a tab. Likewise, the tab would extend straight out from a material plane.

When a media storage unit comprising a plurality of pockets, made according to embodiments of the present invention, is opened the pockets separate sequentially. As an outside material plane (one joined to only one other material plane) of an outside pocket is moved to open or expand the pocket, the outside material plane moves would move away from a media stored in the pocket until the joined tabs start moving the opposing material plane. The pocket starts to separate from an adjacent opposing pocket and moves an amount determined by the length of the slit. This further opens the pocket until the joined tabs are fully extended at which time the un-slit portion of the common material plane acts like a link and pulls on the next and adjacent pocket. Opened pockets may be allowed to collapse or close as additional pockets are opened creating a ripple affect with leading pockets closing, interior pockets in various stages of opening and trailing pockets closed.

Embodiments of the present invention use the tab width and the degree and shape of edge taper on the tab width to create an expandable and separable pocket that may have variable opening features for a media. For example, the taper may be set so that when a pocket is expanded the joined tab edges contact a stored media at one point creating a retention function for the media. The taper may also be set so that a fully expanded pocket does not contact a stored media at all. Degrees of taper, from no taper to a taper that begins at a particular width and ends in a zero tab width, are possible.

Figure 8:
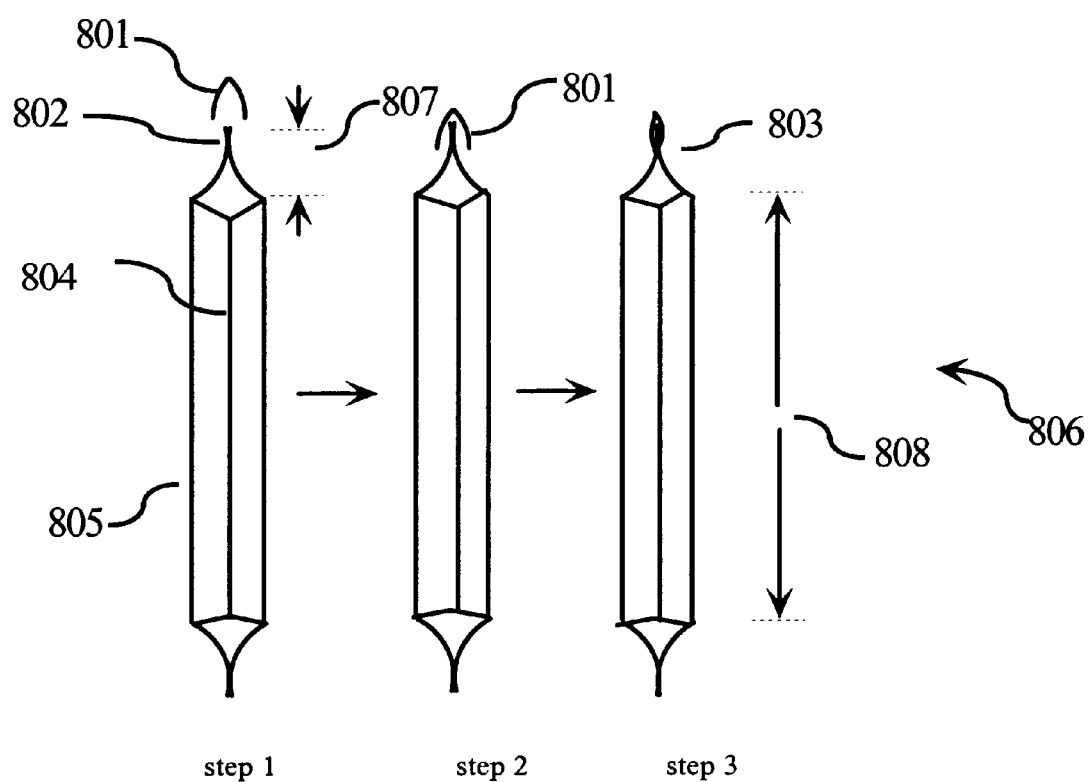
FIG. 8 illustrates an embodiment of the present invention where tabs are joined using an adhesive strip on the outside surface of the tabs.

FIG. 8 illustrates another embodiment of the present invention wherein the tabs are joined by a shaped piece of adhesive material 801. FIG. 8 shows a portion of a pocket 806 looking down on the pocket opening. A material plane 805 forming one side of the pocket 806 and folded side 804 (forms bottom of pocket 806) are visible. The shaped piece of adhesive material 801 is shown, in step 1, step 2 and step 2, being bonded to the outside of the overlaid tabs 802 forming, in step three, bonded tabs 803. Length 807 illustrates the tab width outside the width 808 of a material plane (e.g. 805). Other methods of joining tabs to form retaining sides may be used and still be within the scope of the present invention.

Figure 9A:
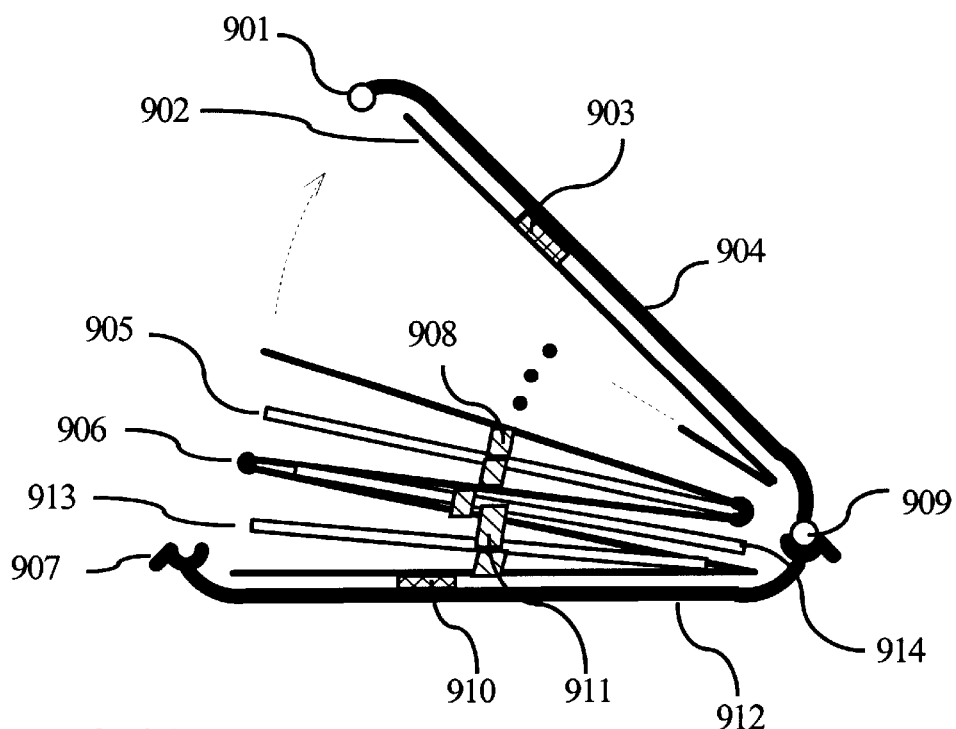
FIG. 9A and 9B illustrates a housing comprising covers and two opposing hinges and latches that may be employed to separate and expand pockets made according to embodiments of the present invention.
Figure 9B:
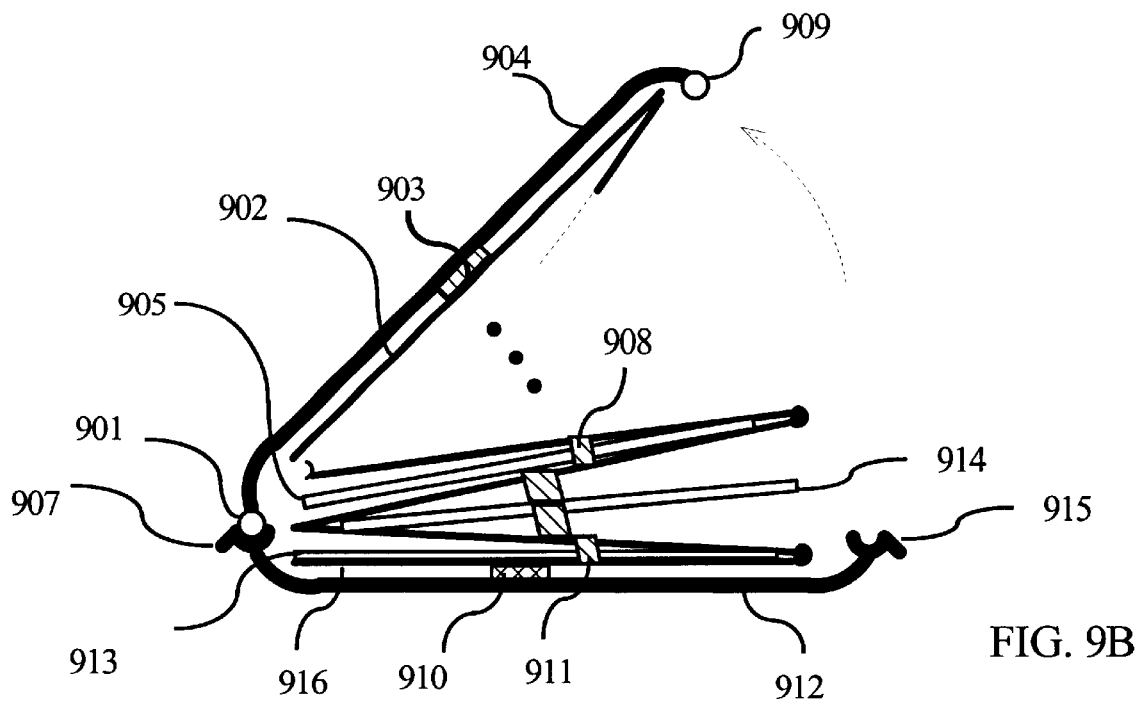

FIG. 9A and 9B illustrates an housing useable with embodiments of the present invention. The housing is comprised of covers 904 and 912 which have two hinges 901 and 909. Latches 907 and 915 are used with hinges 901 and 909 respectively. The storage unit in embodiments of the present invention are positioned between the two covers 904 and 912. Folded side 906 represents one of the folded side of a storage unit in embodiments of the present invention. Material planes 902 and 916 are coupled to covers 904 and 912 respectively with attachment means 903 and 910 respectively. Attachment means 903 and 910 may be Velcro, double sided tape, snaps or other types of attachments operable to couple a fabric plane to exemplary covers 904 and 912. Media 905, 913, and 914 are shown in opposing pockets made by overlaid material planes. Joined tabs 908 and 911 form retaining sides of opposing pockets holding media 905 and 914. In FIG. 9A the covers 904 and 912 pivot on hinge 909 separating and expanding pockets with openings directed towards the left exposing media 905 and 913. In FIG. 9B covers 904 and 912 pivot on hinge 901 separating and expanding pockets with openings directed towards the right exposing media 914.

These covers (covers 904 and 912),illustrated in FIGS. 9A and 9B, are used to protect the pockets and to expand and separate the pockets for media access. Each of the two end material planes (e.g., 902 and 916) of a plurality of pockets, made according to embodiments of the present invention, are coupled (e.g., with Velcro, double sided tape, etc.) to one of the covers (e.g., material plane 902 to cover 904) so that when one cover (e.g. 904) is moved away from the other cover (e.g., 912) it pulls the pockets open like expanding an accordion. Various cover designs may be used and still be within embodiments of the present invention.

Although the present invention and its advantages have been described in detail, it should be understood that various changes, substitutions and alterations can be made herein without departing from the spirit and scope of the invention as defined by the appended claims.

What is claimed is:

1. An expandable media storage unit comprising:
   a web of material planes except two end planes of said web z-folded forming overlaid material planes, each of said overlaid material planes having first and second folded sides and first and second unfolded sides, each of said overlaid material planes further comprising:
      a first slit commencing at a mid-point between said first and second folded sides on said first unfolded side and extending a slit length toward a center of said overlaid material plane;
      a second slit commencing at a mid-point between said first and second folded sides on said second unfolded side and extending said slit length toward said center of said overlaid material plane;
      first and second tabs on said first unfolded side and positioned on opposing sides of said first slit, said first tab extending out from said overlaid material plane away from said center of said overlaid material plane a tab width and extending a tab length from said first slit towards said first folded side and said second tab extending out from said overlaid material plane away from said center of said overlaid material plane said tab width and extending said tab length from said first slit towards said second folded side; and
      third and fourth tabs on said second unfolded side and positioned on opposing sides of said second slit, said third tab extending out from said overlaid material plane away form said center of said overlaid material plane said tab width and extending said tab length from said second slit towards said first folded side and said fourth tab extending out from said overlaid material plane away form said center of said overlaid material plane said tab width and extending said tab length from said second slit towards said second folded side;
   wherein corresponding tabs, positioned closest to a common folded side on adjacent overlaid material planes, are joined over said tab width, said tabs on N of said overlaid material planes so joined form N−1 expandable and separable pockets of said media storage unit.

2. The media storage unit of claim 1, wherein said overlaid material planes are formed by z-folding an end to end joined plurality of separate material planes.

3. The media storage unit of claim 1, wherein said slit length determines an amount said pockets separate when said media storage unit is expanded.

4. The media storage unit of claim 1, wherein said tab width determines an amount said pockets expand when separated.

5. The media storage unit of claim 1, wherein a depth of said expandable and separable pockets is substantially equal to one half a distance between said first and second folded sides of said overlaid planes.

6. The media storage unit of claim 1, wherein said tab length does not extend from said first and second slits to said first and second folded sides of said overlaid planes.

7. The media storage unit of claim 1, wherein said tab length extends from said first and second slits to said first and second folded sides of said overlaid planes.

8. The media storage unit of claim 1, wherein said tab width is tapered, said tapered tab starting at a first width at a point closest to a line through and parallel to said first and second slit and ending in a second width.

9. The media storage unit of claim 8, wherein said tapered tab width determines a variable opening width of said expandable and separable pockets when separated.

10. The media storage unit of claim 8, wherein said second width is substantially zero.

11. The media storage unit of claim 8, wherein said tabs are tapered such that a line connecting a point at said first width and extending through a point at said second width will be tangential to or intersect an unfolded side of said overlaid material plane.

12. The media storage unit of claim 8, wherein said tapered tab allows the pocket to open to a width when expanded such that retaining sides formed by said joined tapered tabs contact edges of stored media in said expandable and separable pockets thereby aiding in retaining said stored media when expanding said media storage unit.

13. An expandable media storage unit comprising:
   a web of material planes excepting two end planes of said web z-folded forming overlaid material planes each of said overlaid material planes having first and second folded sides and first and second unfolded sides, each of said overlaid material planes further comprising:
      a first slit commencing at a mid-point between said first and second folded sides on said first unfolded side and extending a slit length toward a center of said overlaid material plane;
      a second slit commencing at a mid-point between said first and second folded sides on said second unfolded side and extending said slit length toward said center of said overlaid material plane;
      a first tab positioned adjacent to said first slit and extending a tab length from said first slit toward said first folded side of said material planes and extending a tab width away from a first unfolded side of said overlaid material plane; and a second tab positioned adjacent to said second slit and extending said tab length from said second slit toward said first folded side of said material plane and extending said tab width away from a second unfolded side of said overlaid material plane, wherein said first tab on a first material plane is folded on a first tab fold line and joined to a corresponding overlaid and adjacent second material plane, further said second tab on said first material plane is folded on a second tab fold line and joined to said second material plane, tabs on N overlaid material planes so joined form N−1 expandable and separable pockets of said media storage unit.

14. The media storage unit of claim 13, wherein said overlaid material planes are formed by z-folding an end to end joined plurality of separate material planes.

15. The media storage unit of claim 13, wherein said slit length determines an amount said pockets separate when said media storage unit is expanded.

16. By The media storage unit of claim 13, wherein said tab width, when said first and second tabs are joined, determines an amount said pocket expands when said pocket is separated.

17. The media storage unit of claim 13, wherein a depth of said expandable and separable pocket, when separated, is substantially equal to one half a distance between said first and second folded sides of said overlaid planes.

18. The media storage unit of claim 13, wherein said first tab comprises first and second parallelogram material shapes on each side of said first tab fold line, wherein edges of said first and second parallelogram material shapes are mirror image projections about said first tab fold line.

19. The media storage unit of claim 13, wherein said second tab comprises third and fourth parallelogram material shapes on each side of said second tab fold line, wherein edges of said third and fourth parallelogram material shapes are mirror image projections about said second tab fold line.

20. The media storage unit of claim 18, wherein said first fold line is at an acute angle with respect to said first slit, further said edges of said second parallelogram shape become parallel to said first slit when said second parallelogram shape is folded along said first fold line and joined to said second material plane.

21. The media storage unit of claim 19 wherein said second fold line is at an acute angle with respect to said second slit, further said edges of said fourth parallelogram shape become parallel to said second slit when said fourth parallelogram shape is folded along said second fold line and joined to said second material plane.

22. The media storage unit of claim 20, wherein a projection of said first tab fold line, on said first tab, intersects said overlaid material plane at a first tab edge of said first tab where said first tab edge meets said overlaid material plane, said first tab edge positioned away from said slit towards one of said first folded side of said overlaid material plane.

23. The media storage unit of claim 21, wherein a projection of said second tab fold line on said second tab intersects said overlaid material plane at a second tab edge of said second tab where said second tab edge meets said overlaid material plane, said second tab edge positioned away from said second slit towards said first folded side of said overlaid material plane.

24. An expandable media storage unit comprising:

a web of material plane excepting two end planes of said web z-folded forming overlaid material planes, each of said overlaid material planes having first and second folded sides and first and second unfolded sides, each of said overlaid material planes further comprising:

a first and a second tab on said first unfolded side, said first and second tabs positioned symmetrically apart a tab space about a first line through a center of said material planes said first line parallel to said folded sides, said first tab extending out a tab width from said overlaid material plane away from a second line through said center of said overlaid material plane, said second line perpendicular to said folded sides and said first tab also extending a tab length from said first line towards said first folded side and said second tab extending out said tab width from said overlaid material plane away from said second line, and said second tab extending said tab length from said first line towards said second folded side; and a third and a fourth tab on said second unfolded side, said third and fourth tabs positioned symmetrically apart said tab space about said first line, said third tab extending out said tab width from said overlaid material plane away from said second line and extending said tab length from said first line towards said first folded side and said fourth tab extending out said tab width from said overlaid material plane away from said second line and extending said tab length from said first line towards said second folded side, wherein corresponding tabs, positioned closest to a common folded side on adjacent overlaid material planes, are joined over said tab width, said tabs on N of said overlaid material planes so joined form N−1 expandable and separable pockets of said media storage unit.

25. The media storage unit of claim 24, wherein said overlaid material planes are formed by z-folding an end to end joined plurality of separate material planes.

26. The media storage unit of claim 24, wherein said tab space determines an amount said pockets separate when said media storage unit is expanded.

27. The media storage unit of claim 24, wherein said tab width, when said tabs are joined, determines an amount said pockets expand when separated.

28. The media storage unit of claim 24, wherein said tab width is tapered, said tapered tab starting at a first width at a point closest to said first line ending in a second width, said first width larger than said second width.

29. The media storage unit of claim 28, wherein said tapered tab width, on joined tabs, determines a variable opening width of said expandable and separable pockets when separated.

30. The media storage unit of claim 28, wherein said second width is substantially zero.

31. The media storage unit of claim 28, wherein said tapered tab allows said expandable and separable pocket to open to a width when expanded such that said retaining sides contact edges of a stored media when expanding said media storage unit.

* * * * *